(12) United States Patent
Lee

(10) Patent No.: US 7,035,085 B2
(45) Date of Patent: Apr. 25, 2006

(54) BUS-LINE PARTITION PLATE

(75) Inventor: Pi-Yun Lee, Taipei (TW)

(73) Assignee: Tatung Co., Ltd., Taipei (TW)

( * ) Notice: Subject to any disclaimer, the term of this patent is extended or adjusted under 35 U.S.C. 154(b) by 261 days.

(21) Appl. No.: 10/793,784

(22) Filed: Mar. 8, 2004

(65) Prior Publication Data

US 2005/0105251 A1    May 19, 2005

(30) Foreign Application Priority Data

Nov. 14, 2003   (TW) .............................. 92220230 U

(51) Int. Cl.
*G06F 1/16*    (2006.01)
(52) U.S. Cl. ....................... 361/624; 361/679; 361/683; 361/600; 312/223.1; 312/223.2; 174/52.1; 174/68.2; 174/101
(58) Field of Classification Search ................ 361/600, 361/601, 679, 683, 736, 752, 816; 312/223.1, 312/223.2, 223.3, 194; 174/15.1, 16.1, 52.1, 174/68.2, 101
See application file for complete search history.

(56) References Cited

U.S. PATENT DOCUMENTS

| | | | | |
|---|---|---|---|---|
| 4,731,029 | A | * | 3/1988 | Lerner et al. .................. 439/4 |
| 5,825,615 | A | * | 10/1998 | Ohara ........................ 361/683 |
| 5,835,346 | A | * | 11/1998 | Albani et al. ............... 361/684 |
| 6,058,011 | A | * | 5/2000 | Hardt et al. ................ 361/694 |
| 2003/0076652 | A1 | * | 4/2003 | Ahn ........................... 361/683 |

* cited by examiner

*Primary Examiner*—Michael Datskovskiy
(74) *Attorney, Agent, or Firm*—Bacon & Thomas, PLLC

(57) ABSTRACT

A bus-line partition plate mounted in a case of a computer and defining with one side panel of the case a bus-line receiving space for receiving bus-lines, for example, bus-lines of computer apparatus and/or power cords in good order without the use of binding wires or adhesive tapes, preventing interference of bus-lines with other internal apparatus of the computer or damage of bus-lines by other internal apparatus of the computer.

5 Claims, 3 Drawing Sheets

BUS-LINE PARTITION PLATE

BACKGROUND OF THE INVENTION

1. Field of the Invention

The present invention relates to a bus-line partition plate and, more particularly, to such a bus-line partition plate, which is practical for use in a computer to keep bus-lines in good order.

2. Description of Related Art

A computer has many electronic parts or peripheral apparatus such as motherboard, hard diskdrive, floppy diskdrive, CD-ROM player, power supply unit, and etc. Bus-lines and power cords are used to connect these electronic parts and peripheral apparatus to one another so that necessary working electricity can be provided to these electronic parts and peripheral apparatus, and data can be transmitted through these electronic parts and peripheral apparatus during the operation of the computer.

The arrangement of the aforesaid bus-lines and power cords (the so-called bus-lines arrangement) according to conventional methods is to tie up the bus-lines with a binding wire or adhesive tape, and then insert the tied bus-lines in a gap inside the computer, or to directly adhere the bus-lines to the inside wall of the case of the computer with an adhesive tape. These conventional bus-lines arrangement methods take much time, the bus-lines tend to be scratched by or interfered with other internal apparatus of the computer.

Therefore, it is desirable to provide a bus-line partition plate that eliminates the aforesaid problems.

SUMMARY OF THE INVENTION

The present invention has been accomplished under the circumstances in view. It is therefore the main object of the present invention to provide a bus-line partition plate, which keeps bus-lines in good order without interfering with other apparatus, preventing damaging of bus-lines by other apparatus.

To achieve this and other objects of the present invention, the bus-line partition plate mounted inside a case of a computer. The case of the computer comprises a side panel, and a plurality of L-shaped hooks respectively inwardly protruded from a top side of the side panel. The bus-line partition plate has a top side curved in one direction to form an angle and a flange, and a plurality of retaining holes spaced along the angle respectively corresponding to and relatively greater than the L-shaped hooks. When the retaining holes of the bus-line partition plate respectively sleeved onto the L-shaped hooks of the side panel and moved sideways to force the retaining holes respectively into engagement with the L-shaped hooks, a bus-line receiving space is defined between the bus-line partition plate and the side panel for receiving bus-line of the computer.

Thus, bus-lines of the apparatus inside the computer and/or power cords of the circuit board and others can be received in the bus-line receiving space. Therefore, the bus-lines does not interfere with the arrangement of the internal apparatus of the computer, and the bus-lines will not be scratched or damaged by the internal apparatus of the computer. Further, because the bus-lines are gathered in the bus-line receiving space, no binding means or adhesive tape means is necessary to hold the bus-lines in good order.

Further, the side panel of the case of the computer has a substantially U-shaped flange curved inwardly downwards from the top side thereof, and the L-shaped hooks are respectively protruded downwardly from a bottom side of the U-shaped flange. The computer further comprises a circuit board horizontally mounted on a bottom panel of the case, and the bus-line partition plate has a bottom edge stopped at a top side of the circuit board. The bus-line partition plate further has at least one opening in a bottom edge thereof for enabling gathered bus-lines to be extended out of the bus-line receiving space.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
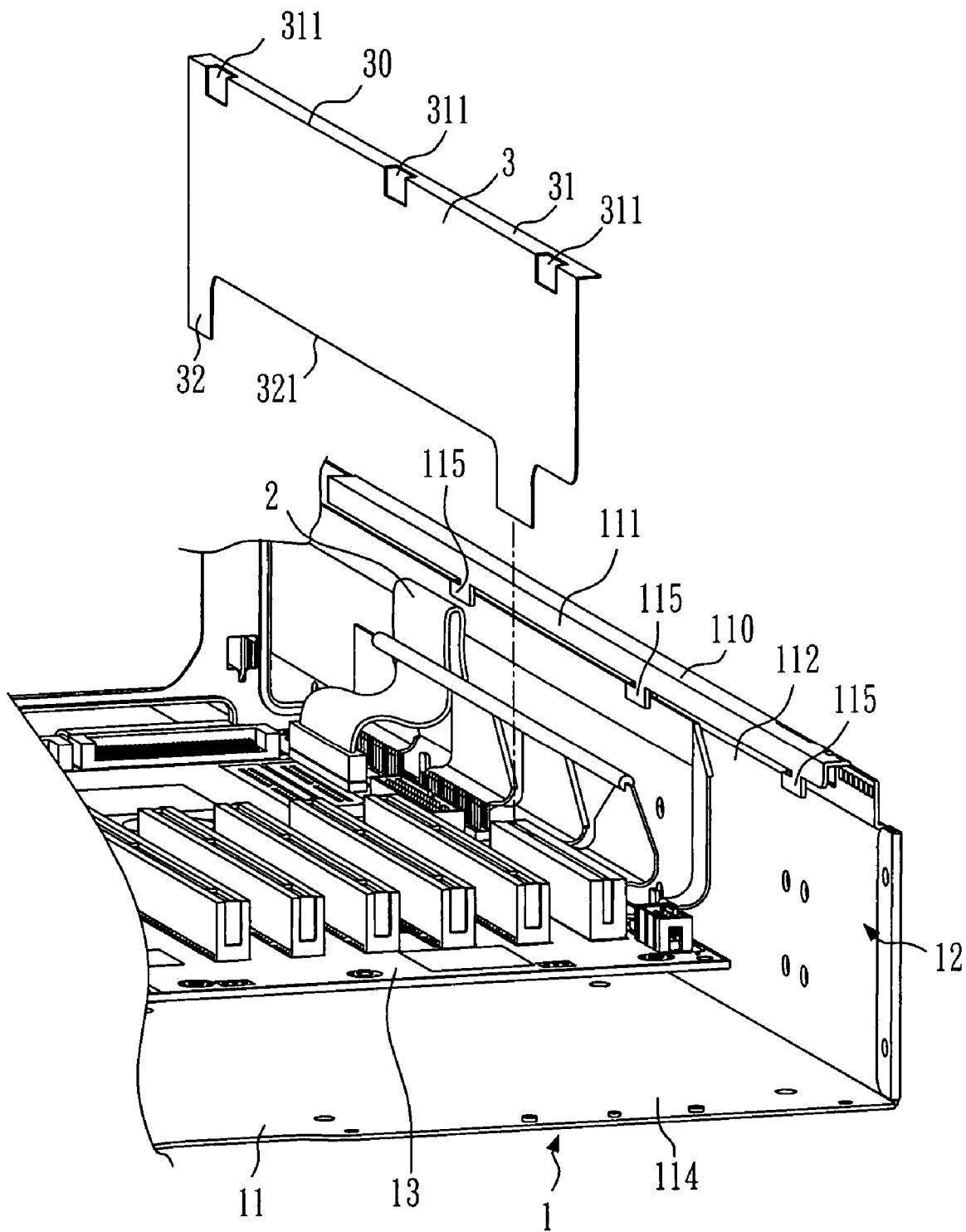
FIG. 1 is an exploded of the present invention.
Figure 2:
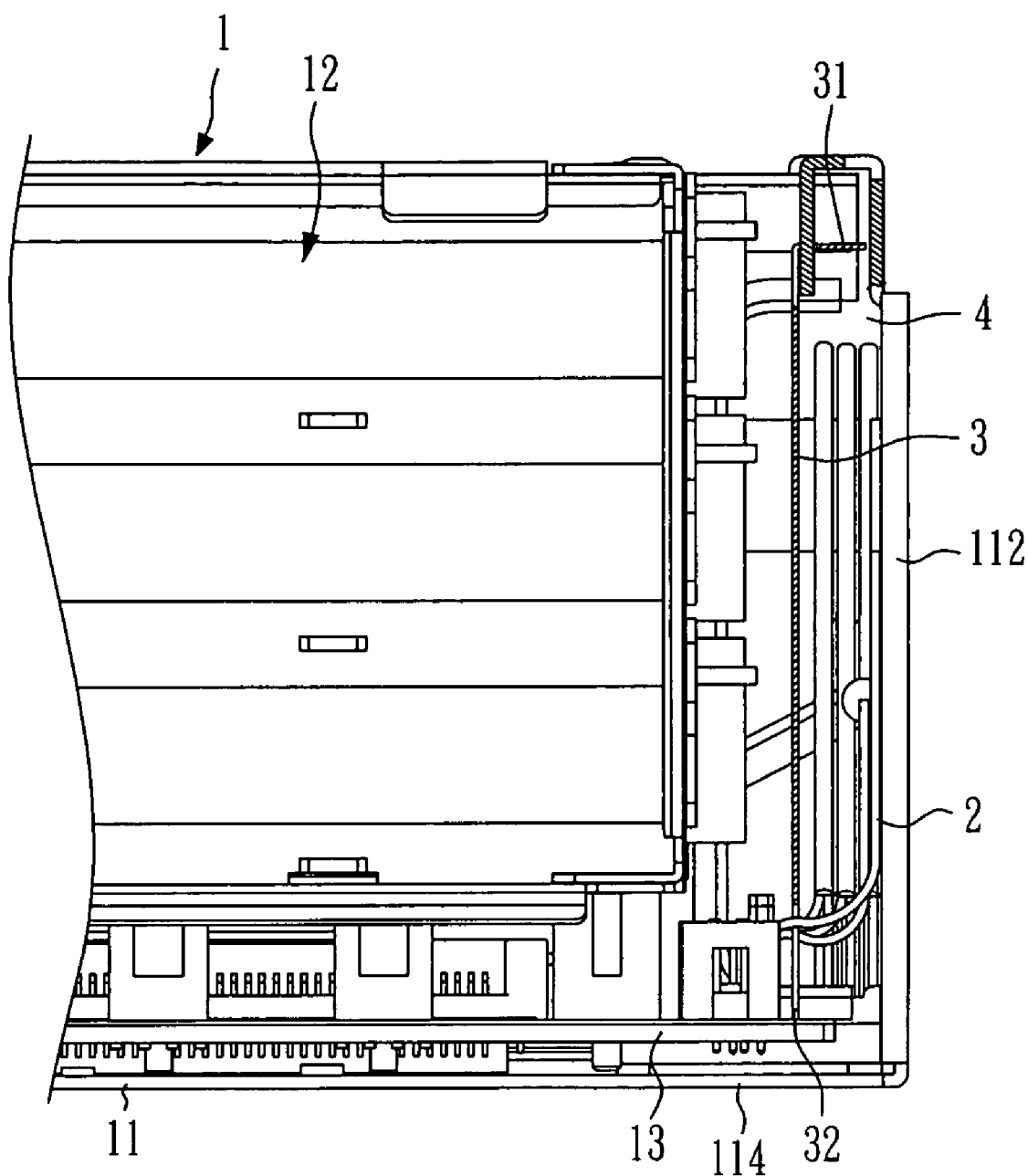
FIG. 2 is a sectional view of the present invention.
Figure 3:
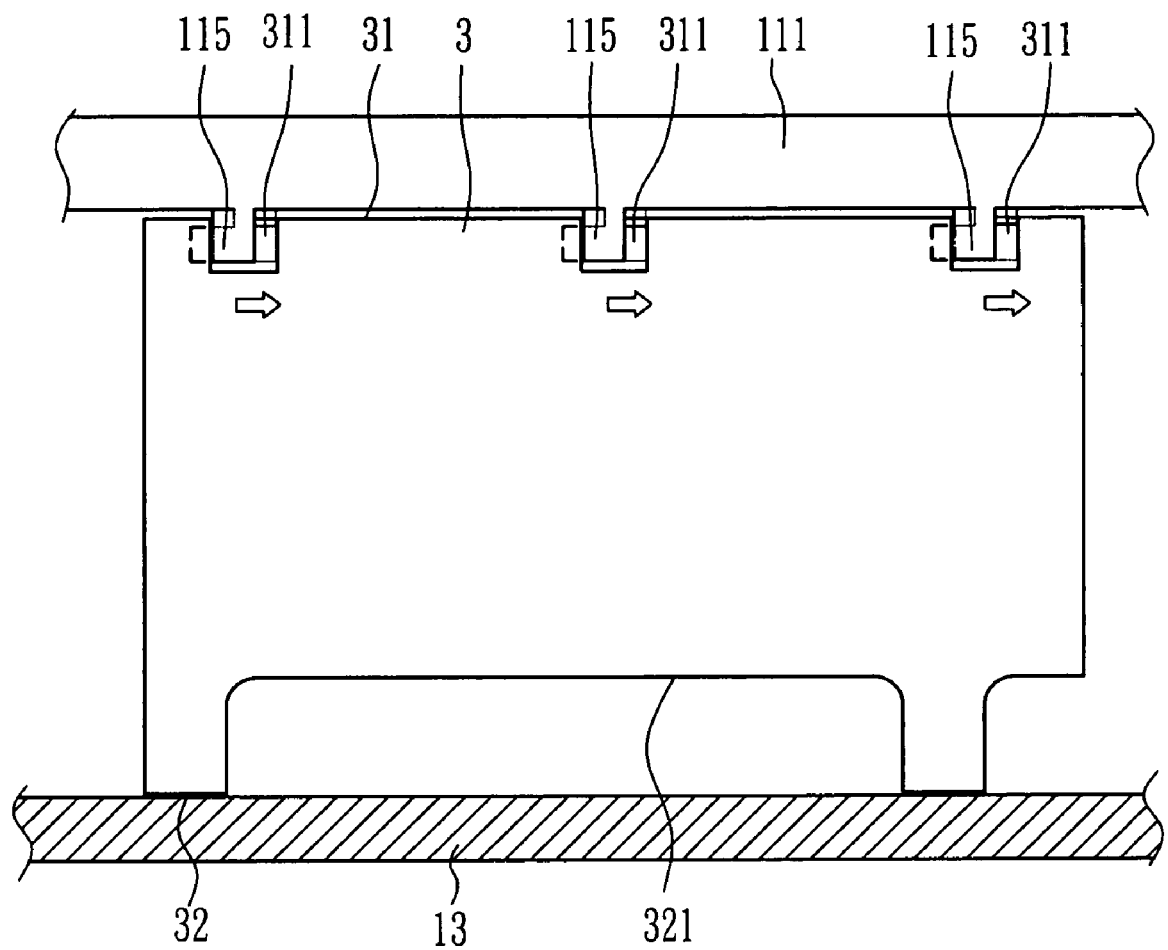
FIG. 3 is a schematic drawing showing the installation of the bus-line partition plate in the case of the computer according to the present invention.

Referring to FIGS. 1~3, a bus-line partition plate 3 is shown installed in the inside of a computer 1.

The case 11 of the computer 1 comprises a side panel 112. The side panel 112 has a substantially U-shaped flange 111 curved inwardly downwards from the top side 110 thereof, and three L-shaped hooks 15 protruded downwardly from the bottom side of the U-shaped flange 111. Further, the computer 1 comprises a circuit board 13 horizontally mounted on the bottom panel 114 of the case 11.

The bus-line partition plate 3 is a thin sheet member made from plastics, having a top side curved in one direction to form an angle 30 and a flange 31, three retaining holes 311 spaced along the angle 30 respectively corresponding to and relatively greater than the L-shaped hooks 115. The retaining holes 311 of the bus-line partition plate 3 sleeved onto the L-shaped hooks 115 of the side panel 112, and then the bus-line partition plate 3 is moved sideways to force the retaining holes 311 respectively into engagement with the L-shaped hooks 115. After engagement between the retaining holes 311 and the L-shaped hooks 15, a bus-line receiving space 4 is defined between the bus-line partition plate 3 and the side panel 112, the bottom edge 32 of the bus-line partition plate 3 is stopped at the top side of the circuit board 3, and an opening 321 is formed in the bottom edge 32 of the bus-line partition plate 3.

Thus, bus-lines of the apparatus inside the computer and/or power cords of the circuit board 13 and others can be received in the bus-line receiving space 4 and extended out of the outside through the opening 321 in the bottom edge 32 of the bus-line partition plate 3. Therefore, the bus-lines 2 does not interfere with the arrangement of the internal apparatus of the computer 1, and the bus-lines 2 will not be scratched or damaged by the internal apparatus of the computer 1. Further, because the bus-lines 2 are gathered in the bus-line receiving space 4, no binding means or adhesive tape means is necessary to hold the bus-lines 2 in good order.

A prototype of bus-line partition plate has been constructed with the features of FIGS. 1~3. The bus-line partition plate functions smoothly to provide all of the features discussed earlier.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A bus-line partition plate mounted inside a computer, said computer comprising a case, said case comprising a side panel and a plurality of L-shaped hooks respectively inwardly protruded from a top side of said side panel;

wherein, said bus-line partition plate has a top side curved in one direction to form an angle and a flange, and a plurality of retaining holes spaced along said angle respectively corresponding to and relatively greater than said L-shaped hooks, such that when the retaining holes of said bus-line partition plate respectively sleeved onto the L-shaped hooks of said side panel and moved sideways to force said retaining holes respectively into engagement with said L-shaped hooks, a bus-line receiving space is defined between said bus-line partition plate and said side panel for receiving bus-line of said computer.

2. The bus-line partition plate as claimed in claim 1, wherein said side panel of said case of said computer comprises a substantially U-shaped flange curved inwardly downwards from the top side thereof, and said L-shaped hooks are respectively protruded downwardly from a bottom side of said U-shaped flange.

3. The bus-line partition plate as claimed in claim 1, wherein said computer further comprises a circuit board horizontally mounted on a bottom panel of said case, and said bus-line partition plate has a bottom edge stopped at a top side of said circuit board.

4. The bus-line partition plate as claimed in claim 1, wherein said bus-line partition plate is made from plastics.

5. The bus-line partition plate as claimed in claim 1, wherein said bus-line partition plate has at least one opening in a bottom edge thereof.

* * * * *